(12) United States Patent
Lee et al.

(10) Patent No.: US 6,856,617 B2
(45) Date of Patent: Feb. 15, 2005

(54) METHOD FOR PROCESSING OUTGOING CALL IN VOICE OVER INTERNET PROTOCOL (VIP) GATEWAY

(75) Inventors: Dae-Hyun Lee, Seoul (KR); Kyung-Ha Shin, Suwon-shi (KR)

(73) Assignee: Samsung Electronics Co., LTD, Suwon-si (KR)

( * ) Notice: Subject to any disclaimer, the term of this patent is extended or adjusted under 35 U.S.C. 154(b) by 904 days.

(21) Appl. No.: 09/810,606

(22) Filed: Mar. 19, 2001

(65) Prior Publication Data

US 2001/0046226 A1 Nov. 29, 2001

(30) Foreign Application Priority Data

May 24, 2000 (KR) ..................................... P2000-28164

(51) Int. Cl.⁷ .............................................. H04L 12/66
(52) U.S. Cl. ....................................... 370/352; 370/401
(58) Field of Search ................................. 370/352, 353, 370/354, 355, 356, 401, 410, 522

(56) References Cited

U.S. PATENT DOCUMENTS

| | | |
|---|---|---|
| 4,159,402 A | 6/1979 | De Graauw et al. |
| 5,333,185 A | 7/1994 | Burke et al. |
| 5,524,146 A | 6/1996 | Morrisey et al. |
| 5,911,485 A | 6/1999 | Rossmann |
| 5,940,478 A | 8/1999 | Vaudreuil et al. |
| 5,956,394 A | 9/1999 | Andruska et al. |
| 6,016,343 A | 1/2000 | Hogan et al. |
| 6,021,126 A | 2/2000 | White et al. |
| 6,026,087 A | 2/2000 | Mirashrafi et al. |
| 6,038,227 A | 3/2000 | Farris et al. |
| 6,069,890 A * | 5/2000 | White et al. ................ 370/352 |
| 6,075,783 A | 6/2000 | Voit |
| 6,078,579 A | 6/2000 | Weingarten |
| 6,078,582 A | 6/2000 | Curry et al. |
| 6,097,804 A | 8/2000 | Gilbert et al. |
| 6,144,667 A | 11/2000 | Doshi et al. |
| 6,150,962 A | 11/2000 | Rossmann |
| 6,151,390 A | 11/2000 | Volftsun et al. |
| 6,366,576 B1 * | 4/2002 | Haga .......................... 370/352 |
| 6,426,950 B1 * | 7/2002 | Mistry ........................ 370/352 |
| 6,600,733 B2 * | 7/2003 | Deng .......................... 370/352 |
| 6,735,617 B1 * | 5/2004 | Goodman .................... 709/206 |
| 6,772,210 B1 * | 8/2004 | Edholm ....................... 709/226 |
| 2002/0150080 A1 * | 10/2002 | Bhattacharya et al. ...... 370/351 |

* cited by examiner

Primary Examiner—Chau Nguyen
Assistant Examiner—Christine Ng
(74) Attorney, Agent, or Firm—Robert E. Bushnell, Esq.

(57) ABSTRACT

A method for processing an outgoing call in a VIP gateway system includes the steps of setting a port of an ITM card of a VIP gateway when an outgoing telephone number is inputted, recognizing an area code of the inputted number as an access code of an ITM card of a VIP gateway of the called party, adding a trunk access code matching the ITM access code to the telephone number to obtain an augmented number, and transferring the augmented number to the ITM card of the VIP gateway of the called party.

12 Claims, 4 Drawing Sheets

| No. | ITM ACCESS CODE | IP ADDRESS |
|---|---|---|
| 0 | 100 | 105.52.12.20 |
| 1 | 200 | 168.219.83.220 |
| 2 | 300 | 105.52.10.152 |
| ⋮ | ⋮ | ⋮ |

| No. | ITM ACCESS CODE | ITM LENGTH OF THE ITM ACCESS CODE | DELETION OF THE ITM ACCESS CODE | TRUNK ACCESS CODE | IP TABLE INDEX 1 | IP TABLE INDEX 2 |
|---|---|---|---|---|---|---|
| 0 | 051 | 3 | YES | 9 | 0 | |
| 1 | 0553 | 4 | YES | 9 | 0 | |
| 2 | 046 | 3 | YES | 9 | 1 | |
| ... | ... | ... | ... | ... | ... | ... |

FIG. 4B

| No. | IP ADDRESS |
|---|---|
| 0 | 168.52.12.20 |
| 1 | 168.52.12.21 |
| 2 | 168.52.12.23 |

FIG. 4C

| No. | IP ADDRESS |
|---|---|
| 0 | 168.52.12.40 |
| 1 | 168.52.12.41 |
| 2 | 168.52.12.43 |

METHOD FOR PROCESSING OUTGOING CALL IN VOICE OVER INTERNET PROTOCOL (VIP) GATEWAY

CLAIM OF PRIORITY

This application claims priority to an application entitled "Method for Processing Outgoing Call in Voice over Internet Protocol (VIP) Gateway" filed with the Korean Industrial Property Office on May 24, 2000 and assigned Ser. No. 2000-28164, the contents of which is hereby incorporated by reference.

BACKGROUND OF THE INVENTION

1. Technical Field

The present invention relates generally to a voice over internet protocol (VIP) gateway system and, in particular, to a method for processing an outgoing internet phone call by using an internet telephony module card (ITM card) of a VIP gateway.

2. Related Art

In general, an ITM card of a VIP gateway has an access code of three digits. The ITM card access code is a code required for transferring an outgoing call to a specific ITM card of a VIP gateway of the other party.

In such a VIP gateway system, the ITM card has a database table storing only an IP address matched with an access code of the ITM card of the other party. Therefore, a user who desires to make an internet phone call is required to have prior knowledge of all of the access codes of the ITM card, the extension access codes and the office-line access codes of the other parties. Moreover, the user needs to input all of those numbers by using the dial buttons of a phone. This is a significant disadvantage and inconvenience to the users of such a VIP gateway system.

The following patents generally relate to telephone communication over the internet or switched equipment, but are burdened by the disadvantages of the prior art set forth herein: U.S. Pat. No. 6,151,390 to Volftsun, entitled PROTOCOL CONVERSION USING CHANNEL ASSOCIATED SIGNALING, issued on 21 Nov. 2000, U.S. Pat. No. 6,150,962 to Rossmann, entitled PREDICTIVE DATA ENTRY METHOD FOR A KEYBOARD, issued on Nov. 21, 2000, U.S. Pat. No. 6,144,667 to Doshi, entitled NETWORK-BASED METHOD AND APPARATUS FOR INITIATING AND COMPLETING A TELEPHONE CALL VIA THE INTERNET, issued on Nov. 7, 2000, U.S. Pat. No. 6,097,804 to Gilbert, entitled METHOD AND SYSTEM FOR COMPLETING A VOICE CONNECTION BETWEEN FIRST AND SECOND VOICE TERMINALS IN A SWITCHED TELEPHONE NETWORK, issued on Aug. 1, 2000, U.S. Pat. No. 6,078,582 to Curry, entitled INTERNET LONG DISTANCE TELEPHONE SERVICE, issued on Jun. 20, 2000, U.S. Pat. No. 6,078,579 to Weingarten, entitled TELEPHONE SYSTEMS FOR COMMUNICATION OVER COMPUTER NETWORKS, issued on Jun. 20, 2000, U.S. Pat. No. 6,075,783 to Voit, entitled INTERNET PHONE TO PSTN CELLULAR/PCS SYSTEM, issued on Jun. 13, 2000, U.S. Pat. No. 6,038,227 to Farris, entitled PRESELECTION OF SERVICE PROVIDER AND FUNCTIONALITY, issued on Mar. 14, 2000, U.S. Pat. No. 6,026,087 to Mirashrafi, entitled METHOD AND APPARATUS FOR ESTABLISHING A VOICE CALL TO A PSTN EXTENSION FOR A NETWORKED CLIENT COMPUTER, issued on Feb. 15, 2000, U.S. Pat. No. 6,021,126 to White, entitled TELECOMMUNICATION NUMBER PORTABILITY, issued on Feb. 1, 2000, U.S. Pat. No. 6,016,343 to Hogan, entitled CALL-PROCESSING SYSTEM AND METHOD, issued on Jan. 18, 2000, U.S. Pat. No. 5,956,394 to Andruska et al., entitled COMMON TREATMENT OF CALLS FROM SUBSCRIBERS SERVED BY DIFFERENT TYPES OF TELECOMMUNICATION EQUIPMENT, issued on Sep. 21, 1999, U.S. Pat. No. 5,940,478 to Vaudreuil, entitled METHOD AND SYSTEM FOR EXTENDED ADDRESSING PLANS, issued on Aug. 17, 1999, U.S. Pat. No. 5,911,485 to Rossmann, entitled PREDICTIVE DATA ENTRY METHOD FOR A KEYPAD, issued on Jun. 15, 1999, U.S. Pat. No. 5,524,146 to Morrisey, entitled AUTOMATIC ACCESS TO COMMUNICATION SERVICE PROVIDERS, issued on Jun. 4, 1996, U.S. Pat. No. 5,333,185 to Burke, entitled SYSTEM FOR PROCESSING CALLING PARTY INFORMATION FOR INTERNATIONAL COMMUNICATIONS SERVICES, issued on Jul. 26, 1994, and U.S. Pat. No. 4,159,402 to De Graauw, entitled MEANS FOR IDENTIFYING SUBSCRIBER LINES, issued on Jun. 26, 1979.

SUMMARY OF THE INVENTION

It is, therefore, an object of the present invention to provide a method for processing an outgoing internet call using an ITM card of a VIP gateway by inputting only a phone number of the other party.

To achieve the above object, there is provided a method for processing an outgoing call of a VIP gateway, comprising the steps of: setting a port of an ITM card inside the VIP gateway when an outgoing phone number is inputted; recognizing an area code of the inputted phone number as an ITM card access code of the VIP gateway of the other party; adding a trunk access code matched with the ITM access code to the phone number; and transferring the augmented phone number to the ITM card of the VIP gateway of the other party.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, and wherein:

FIG. 1 is a table exemplifying a database inside the ITM card of a VIP gateway;

FIGS. 4A–4C are tables exemplifying a database inside an ITM card of a VIP gateway according to an embodiment of the present invention.

DETAILED DESCRIPTION OF THE PREFERRED EMBODIMENT

A preferred embodiment of the present invention will be described below with reference to the accompanying drawings. In the following description, well-known functions or constructions are not described in detail since they would obscure the invention in unnecessary detail.

FIG. 1 is a table exemplifying a database inside an ITM card of a VIP gateway.

Referring to FIG. 1, a user first inputs an ITM card port number of a VIP gateway, to which the user belongs, by using dial buttons of a telephone. As a next step, the user inputs an ITM card access code and an extension access code of the VIP gateway of the other party to be contacted. If the other party is an extension subscriber, the user inputs the corresponding extension number, and if the other party is an office-line subscriber, the user inputs the corresponding office-line number. Then, the ITM card of the VIP gateway of the other party identifies an IP address of the ITM card of the other party, which is connected with the inputted ITM access code through designation, by using a database table as shown in FIG. 1. The ITM card of the VIP gateway then deletes the ITM access code of the other party from the dial numbers inputted by the user, and transfers only the extension access code and the corresponding phone number of the other party to the ITM card of the other party through the internet. The ITM card of the other party subsequently analyzes the extension access code and the phone number to transfer the outgoing call to the extension subscriber or the office-line subscriber through the extension line or a public switched telephone network (PSTN).

Figure 2:
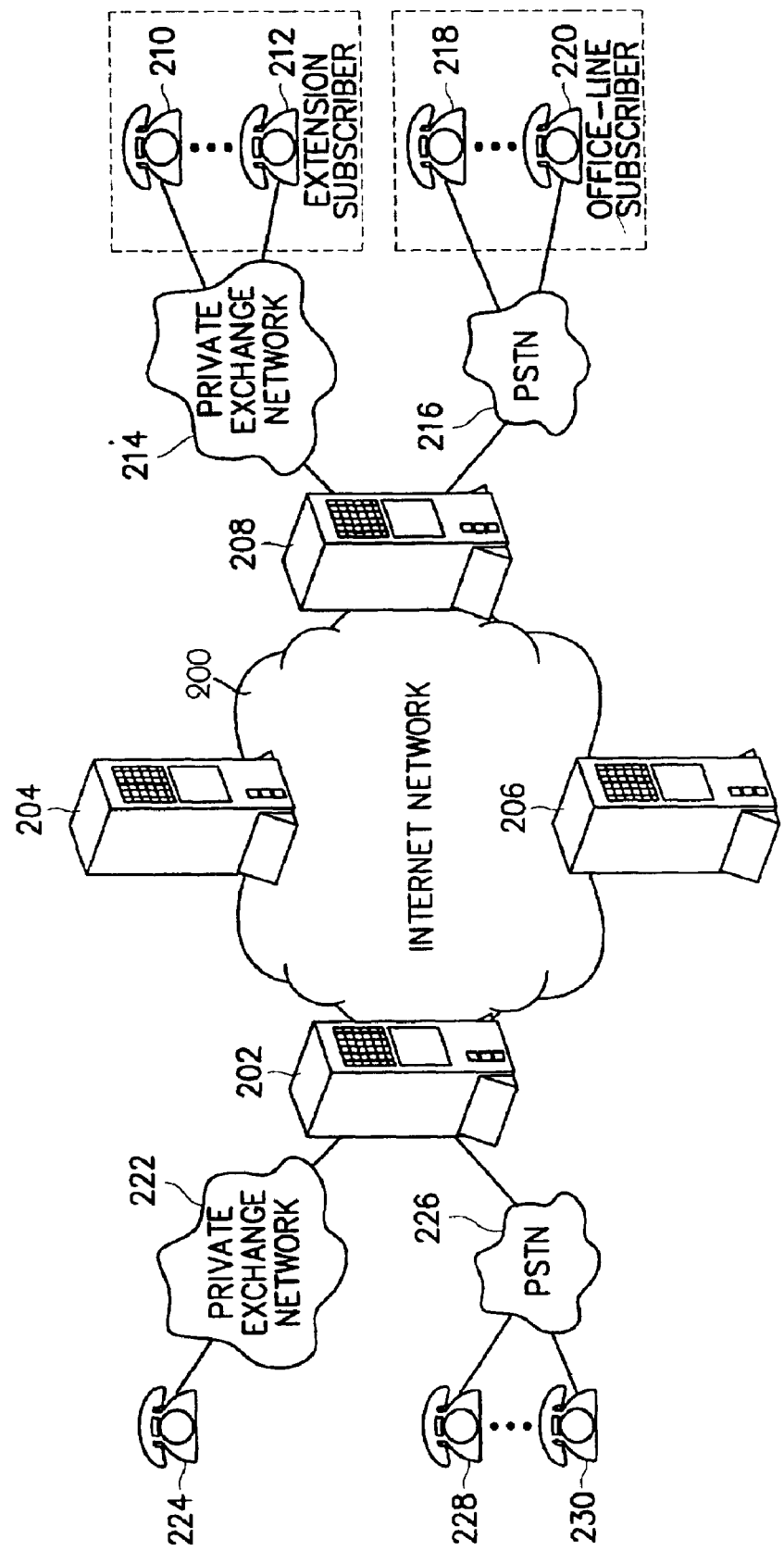
FIG. 2 is a diagram illustrating a VIP gateway system according to an embodiment of the present invention.

FIG. 2 is a diagram illustrating a VIP gateway system according to an embodiment of the present invention.

Referring to FIG. 2, private exchange networks 222, 214 and public switched telephone networks (PSTN) 226, 216 are connected to an internet network 200 through the respectively corresponding VIP gateways 202, 208. Telephones of extension subscribers 224, 210, 212 and office-line subscribers 218, 220, 228, 230 are connected to the private exchange networks 222, 214 and PSTN 226, 216, respectively. The VIP gateways 202, 204, 206, 208 convert signals and data transferred from the respective exchange devices into signals and data compatible with the internet, and link the telephones of the extension subscribers and the office-line subscribers connected to the PSTN 226, 216 and the private exchange networks 222, 214 with the internet network 200.

Figure 3:
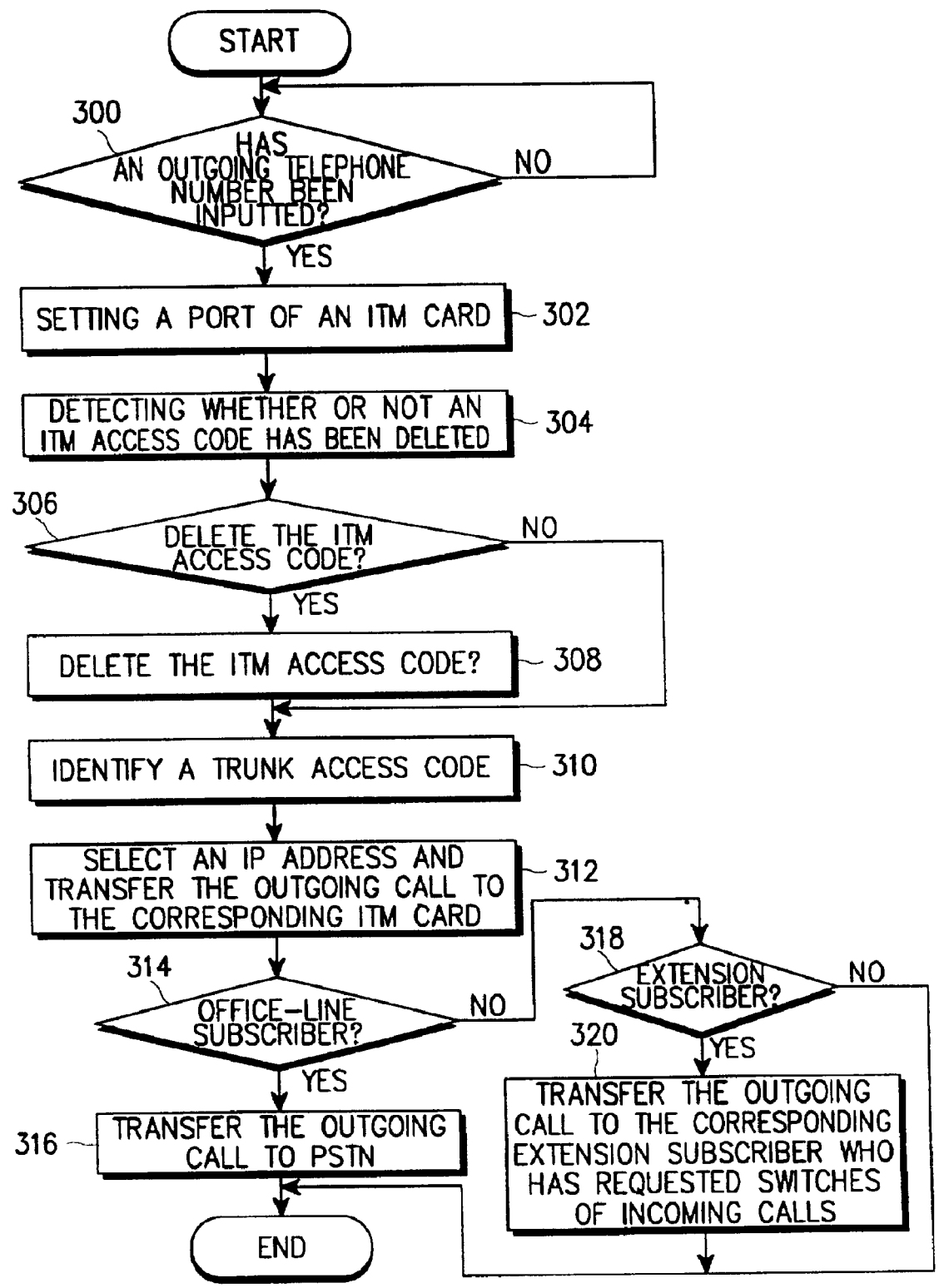
FIG. 3 is a flow chart illustrating a process for handling an outgoing call of a VIP gateway according to an embodiment of the present invention.

FIG. 3 is a flow chart illustrating a process for handling an outgoing call of an ITM card of a VIP gateway connecting an internet phone by using only a phone number of the other party according to an embodiment of the present invention. FIG. 4 is a table exemplifying a database inside a memory of an ITM card according to an embodiment of the present invention.

An embodiment of the present invention will now be described in detail with reference to FIGS. 2, 3 and 4A–4C.

First, a user who desires to make an internet phone call by using an ITM card inputs a phone number only of the called party. In step 300, the ITM card inside the VIP gateway 202 determines that an outgoing telephone number has been inputted, and then proceeds with step 302 to set a port for connection to the internet in response thereto. In step 304, the ITM card detects whether or not an area code, which was allocated as an ITM access code among the dial numbers inputted by the user according to an embodiment of the present invention, has been deleted by referring to the database table shown in FIGS. 4A–4C. If the outgoing call by the user is a telephone number within the area of the VIP gateway 208 of the other party who has received the outgoing call, the ITM access code is displayed as "deleted" on the database table. Otherwise, the ITM access code is displayed as "retained" on the database table.

When the ITM access code is displayed as "deleted," the ITM card of the user responds to step 306 by deleting the area code corresponding to the ITM access code of the dial numbers inputted by the user in step 308. For example, assuming that a user in Seoul has inputted dial numbers "051-393-4726," the VIP gateway of the user in Seoul recognizes that "051" is the access code of the ITM card of the VIP gateway 208 of the other party with respect to the outgoing call according to an embodiment of the present invention. Also, since the database table in FIG. 4A shows that the ITM access code "051" is to be "deleted", the number "051" corresponding to the ITM access code among the inputted dial numbers is deleted in step 308.

In step 310, the ITM identifies a trunk access code value matching the ITM access code, adds the trunk access code to the dial numbers inputted by the user and from which the ITM access code is excluded, and transfers the numbers to the ITM card of the VIP gateway 208 of the other party. Referring to the dial numbers "051-393-4726" inputted by the user as exemplified above, the trunk access code value corresponding to the ITM access code "051" is set to "9" as shown in FIG. 4A. Therefore, the ultimate dial number transferred to the other party is "9-393-4726."

In step 312, the ITM card identifies an IP table index value corresponding to "051" shown in the database table of FIG. 4A, selects one of the IP addresses shown in the IP address table of FIG. 4B, and transfers the outgoing call to the corresponding ITM card. The ITM card, which has received the outgoing call of other party, detects the trunk access code of the received dial number, determines whether the dial number belongs to an office-subscriber in step 314, and transfers the outgoing call to the PSTN 216 in step 316 if the dial number is determined to belong to an office-line subscriber. If the dial number is determined to belong to an extension subscriber in step 318 as a result of detecting the trunk access code, the ITM card proceeds with step 320 so to transfer the outgoing call to the corresponding extension subscriber of the private exchange network 214.

As described above, the method for processing an outgoing call in a VIP gateway according to the present invention provides the advantage of using an area code as an ITM access code in a direct manner by additionally including diverse information in the database constituting the ITM card of the VIP gateway and varying the length of ITM access code. As a consequence, the user can make an internet phone call with ease and convenience, as in the case of a long-distance call in general.

While the invention has been shown and described with reference to a certain preferred embodiment thereof, it will be understood by those skilled in the art that various changes in form and detail may be made without departing from the spirit and scope of the invention as defined by the appended claims.

What is claimed is:

1. A method for processing an outgoing call in a Voice over Internet Protocol (VIP) gateway system, comprising the steps of:

setting a port of an internet telephony module (ITM) card of the VIP gateway system when a telephone number is inputted;

recognizing an area code of the inputted telephone number as an access code of an ITM card of a VIP gateway of a called party; and adding a trunk access code matching the ITM access code to the inputted telephone number to obtain an augmented number, and transferring the augmented number to the ITM card of the VIP gateway of the called party.

2. The method of claim 1, wherein the transferring of the augmented number is accomplished by deleting the ITM access code when the inputted telephone number constitutes a call from another area not associated with the VIP gateway of the called party.

3. The method of claim 2, wherein the ITM card comprises a database table including at least one of a variable ITM access code, a length of the variable ITM access code, an indication as to whether the ITM access code is to be deleted, a trunk access code, and an IP table index.

4. The method of claim 1, wherein the ITM card comprises a database table including at least one of a variable ITM access code, a length of the variable ITM access code, an indication as to whether the ITM access code is to be deleted, a trunk access code, and an IP table index.

5. The method of claim 1, wherein the transferring of the augmented number comprises:

determining whether the inputted telephone number belongs to an office-line subscriber; and when the inputted telephone number does belong to an office-line subscriber, transferring the call to a public switched telephone network.

6. The method of claim 5, wherein the transferring of the augmented number comprises:

determining whether the inputted telephone number belongs to an extension subscriber; and when the inputted telephone number does belong to an extension subscriber, transferring the call to the extension subscriber.

7. The method of claim 1, wherein the transferring of the augmented number comprises:

determining whether the inputted telephone number belongs to an extension subscriber; and when the inputted telephone number does belong to an extension subscriber, transferring the call to the extension subscriber.

8. A method for processing an outgoing call in a Voice over Internet Protocol (VIP) gateway system, comprising the steps of:

setting a port of an internet telephony module (ITM) card of the VIP gateway system when a telephone number is inputted;

recognizing an area code of the inputted telephone number as an access code of the ITM card of a VIP gateway of a called party;

determining whether an ITM access code is detected; and adding a trunk access code matching the ITM access code to the inputted telephone number to obtain an augmented number, and transferring the augmented number to the ITM card of the VIP gateway of the called party.

9. The method of claim 8, wherein the ITM card comprises a database table including at least one of a variable ITM access code, a length of the variable ITM access code, an indication as to whether the ITM access code is to be deleted, a trunk access code, and an IP table index.

10. The method of claim 8, wherein the transferring of the augmented number comprises:

determining whether the inputted telephone number belongs to an office-line subscriber; and when the inputted telephone number does belong to an office-line subscriber, transferring the call to a public switched telephone network.

11. The method of claim 10, wherein the transferring of the augmented number comprises:

determining whether the inputted telephone number belongs to an extension subscriber; and when the inputted telephone number does belong to an extension subscriber, transferring the call to the extension subscriber.

12. The method of claim 8, wherein the transferring of the augmented number comprises:

determining whether the inputted telephone number belongs to an extension subscriber; and when the inputted telephone number does belong to an extension subscriber, transferring the call to the extension subscriber.

* * * * *